(12) United States Patent
Zhao et al.

(10) Patent No.: US 11,856,620 B1
(45) Date of Patent: Dec. 26, 2023

(54) BLUETOOTH COMMUNICATION METHOD, MOBILE TERMINAL AND NON-VOLATILE STORAGE MEDIUM

(71) Applicant: Degrii Co., Ltd., Jiangsu (CN)

(72) Inventors: Ye Zhao, Jiangsu (CN); Zhihai Fan, Jiangsu (CN); Kai Qi, Jiangsu (CN); Fei Zhao, Jiangsu (CN)

(73) Assignee: Degril Co., Ltd., Suzhou (CN)

( * ) Notice: Subject to any disclaimer, the term of this patent is extended or adjusted under 35 U.S.C. 154(b) by 0 days.

(21) Appl. No.: 18/330,611

(22) Filed: Jun. 7, 2023

(30) Foreign Application Priority Data

Nov. 9, 2022 (CN) .......................... 202211398141.4

(51) Int. Cl.
*H04W 76/10* (2018.01)
*H04W 76/30* (2018.01)
*H04W 8/00* (2009.01)

(52) U.S. Cl.
CPC ........... *H04W 76/10* (2018.02); *H04W 8/005* (2013.01); *H04W 76/30* (2018.02)

(58) Field of Classification Search
CPC ...... H04W 76/10; H04W 8/005; H04W 76/30
See application file for complete search history.

(56) References Cited

U.S. PATENT DOCUMENTS

2017/0243094 A1\* 8/2017 Yamada ................. G06F 3/1204
2018/0248991 A1\* 8/2018 Ryu .................. H04M 1/72469

\* cited by examiner

*Primary Examiner* — Tuan H Nguyen

(57) ABSTRACT

The embodiment of the present application discloses a Bluetooth communication method, comprising: detecting a posture of a mobile terminal; establishing a Bluetooth connection with a desired Bluetooth device when a first posture is detected; and/or disconnecting the Bluetooth connection when a second posture is detected, wherein the second posture is different from the first posture.

18 Claims, 2 Drawing Sheets

BLUETOOTH COMMUNICATION METHOD, MOBILE TERMINAL AND NON-VOLATILE STORAGE MEDIUM

CROSS-REFERENCE

This application claims priority to and the benefit of Chinese Patent Application No. 202211398141.4, entitled "Bluetooth communication method, mobile terminal and non-volatile storage medium," filed on Nov. 9, 2022. The entire content of this application is incorporated herein by reference in its entirety.

TECHNICAL FIELD

The present application relates to the field of communication, and more specifically to a Bluetooth communication method, a mobile terminal and a non-volatile storage medium.

BACKGROUND

Bluetooth technology is an open global specification for wireless data and voice communications, which includes classical Bluetooth technology and Bluetooth Low Energy (BLE) technology and so on. Bluetooth technology is a short-range radio technology based on a low-cost, close-range wireless connection for fixed or mobile device communications.

In the prior art, it requires complex manual operations by a user to connect to or disconnect from Bluetooth devices. For example, in the process of establishing a Bluetooth connection, the user may click on a matching control of a Bluetooth module to enable pairing between devices. After pairing, the user may then clicks on a connection control, such as a "Done" button, to connect with the paired Bluetooth device. In short, the Bluetooth communication operation in the prior art requires very complicated operation by the user, and the user experience is poorer.

Thus, there is an urgent need to design a new Bluetooth communication solution to solve the above problem.

SUMMARY

In order to solve the problems at least partially in prior arts, according to an aspect of the present invention, a Bluetooth communication method is provided. The Bluetooth communication method comprises the following steps: detecting the posture of a mobile terminal; establishing a Bluetooth connection with a desired Bluetooth device when a first posture of the mobile terminal is detected; and/or disconnecting the Bluetooth connection with the connected Bluetooth device when a second posture of the mobile terminal is detected; wherein the first posture and the second posture are different.

Optionally, before said detecting the posture of the mobile terminal, the method further comprises: detecting a motion of the mobile terminal; said establishing and/or disconnecting the Bluetooth connection with the desired Bluetooth device are executed only after detecting a change in the motion of the mobile terminal.

Optionally, said detecting the posture of the mobile terminal comprises: detecting whether the mobile terminal is horizontally placed with its operating surface facing to the left, to determine the first posture; and/or detecting whether the mobile terminal is horizontally placed with its operating surface facing to the right, to determine the second posture.

Optionally, said establishing the Bluetooth connection with the desired Bluetooth device comprises: scanning surrounding Bluetooth devices; sending a Bluetooth connection request to the desired Bluetooth device based on the identifier of the scanned Bluetooth device to connect the desired Bluetooth device via Bluetooth.

Optionally, the method further comprises: acquiring the identifier of the desired Bluetooth device via a network to identify the desired Bluetooth device from the scanned Bluetooth devices before sending the Bluetooth connection request to the desired Bluetooth device.

Optionally, the Bluetooth connection request includes the key of the desired Bluetooth device; and the method further comprises: acquiring the key of the desired Bluetooth device before sending the Bluetooth connection request to the desired Bluetooth device to connect with the desired Bluetooth device via Bluetooth.

Optionally, said disconnecting the Bluetooth connection with the connected Bluetooth device comprises: sending a disconnection request to the connected Bluetooth device based on the identifier thereof to terminate the Bluetooth connection with the connected Bluetooth device and to make the connected Bluetooth device enter a broadcast state.

Optionally, said disconnecting the Bluetooth connection with the connected Bluetooth device further comprises: actively terminating the Bluetooth connection with the connected Bluetooth device if the disconnection request is unsuccessfully responded for a predetermined period of time after it has been sent to the connected Bluetooth device.

Optionally, the method further comprises: sending a first prompt message to a user before establishing the Bluetooth connection with the desired Bluetooth device; wherein said establishing the Bluetooth connection with the desired Bluetooth device is executed only after receiving a first confirmation information from the user in response to the first prompt message.

Optionally, the method further comprises: sending a second prompt message to a user before disconnecting the Bluetooth connection with the connected Bluetooth device; wherein said disconnecting the Bluetooth connection with the connected Bluetooth device is executed only after receiving a second confirmation information from the user in response to the second prompt message.

According to another aspect of the present invention, a mobile terminal is provided. The mobile terminal comprises a posture detection sensor and a Bluetooth communication device. The posture detection sensor is configured to detect the posture of the mobile terminal. The Bluetooth communication device is configured to establish a Bluetooth connection with a desired Bluetooth device when a first posture of the mobile terminal is detected, and/or disconnect the Bluetooth connection with the connected Bluetooth device when a second posture of the mobile terminal is detected. The first posture and the second posture are different.

Optionally, the posture detection sensor is further configured to detect a motion of the mobile terminal, wherein the Bluetooth communication device establishes and/or disconnects the Bluetooth connection with the desired connected Bluetooth device only after a change in the motion of the mobile terminal is detected.

Optionally, the posture detection sensor is an accelerometer, a gyroscope, or an electronic compass.

Optionally, the Bluetooth communication device is further configured to scan surrounding Bluetooth devices and send a Bluetooth connection request to the desired Bluetooth device based on the identifier of the scanned Bluetooth device to connect the desired Bluetooth device via Bluetooth. The mobile terminal further comprises a network communication device configured to acquire the identifier of the desired Bluetooth device via a network to identify the desired Bluetooth device from the scanned Bluetooth devices before the Bluetooth connection request is sent to the desired Bluetooth device Optionally, the network communication device comprises a wired network connection device and/or a wireless network connection device.

Optionally, the mobile terminal further comprises a first output device and a first input device. The first output device is configured to send a first prompt message to a user before the Bluetooth connection with the desired Bluetooth device is established. The first input device is configured to receive a first confirmation information from the user in response to the first prompt message. The Bluetooth communication device establishes the Bluetooth connection with the desired Bluetooth device only after the first confirmation information is received.

Optionally, the first output device and the first input device is a same touch screen.

Optionally, the mobile terminal further comprises a second output device and a second input device. The second output device is configured to send a second prompt message to a user before the Bluetooth connection with the connected Bluetooth device is disconnected. The second input device is configured to receive a second confirmation information from the user in response to the second prompt message. The Bluetooth communication device disconnects the Bluetooth connection with the connected Bluetooth device only after the second confirmation information is received.

Optionally, the mobile terminal is a cell phone, a tablet personal computer, or a remote control.

According to yet another aspect of the present invention, a non-volatile storage medium is provided. The non-volatile storage medium stores program instructions which are configured to perform, when running, the Bluetooth communication method mentioned above.

According to the above-mentioned Bluetooth communication method, by detecting the posture of the mobile terminal, the establishment of the connections with other Bluetooth devices or disconnections from the connected .Bluetooth devices can be realized. This technical solution frees the user's fingers by eliminating the needs for very complicated manual operations for Bluetooth communications. Further, the method makes the processes of establishing Bluetooth connections and disconnection from the connected Bluetooth devices easier and smarter for the user.

The above description is only an overview of the technical solution of the present application. In order to understand the technical solutions of the present application more clearly, and it can be implemented in accordance with the contents of the specification. In order to make the above and other purposes, features and advantages of the present application easier to understand, the following specific embodiments of the present application are cited.

BRIEF DESCRIPTION OF THE DRAWINGS

In order to more clearly illustrate the embodiments of the present application, the following is a brief description of the accompanying drawings to be used in the description of the embodiments. Obviously, the drawings in the following description are only for the purpose of illustrating more clearly the technical solutions in the embodiments of the present application, and other drawings can be obtained from these drawings without creative work for those skilled in the art.

DETAILED DESCRIPTION OF THE EMBODIMENTS

The present application is further described below in connection with specific embodiments, and the advantages and features of the present application will become clearer as they are described. These embodiments, however, are merely exemplary and do not constitute any limitation on the scope of the present application. It should be understood by those skilled in the art that modifications or substitutions may be made to the details and forms of the technical solutions of these embodiments without departing from the spirit and scope of this application, but such modifications and substitutions fall within the scope of protection of this application.

Figure 1:
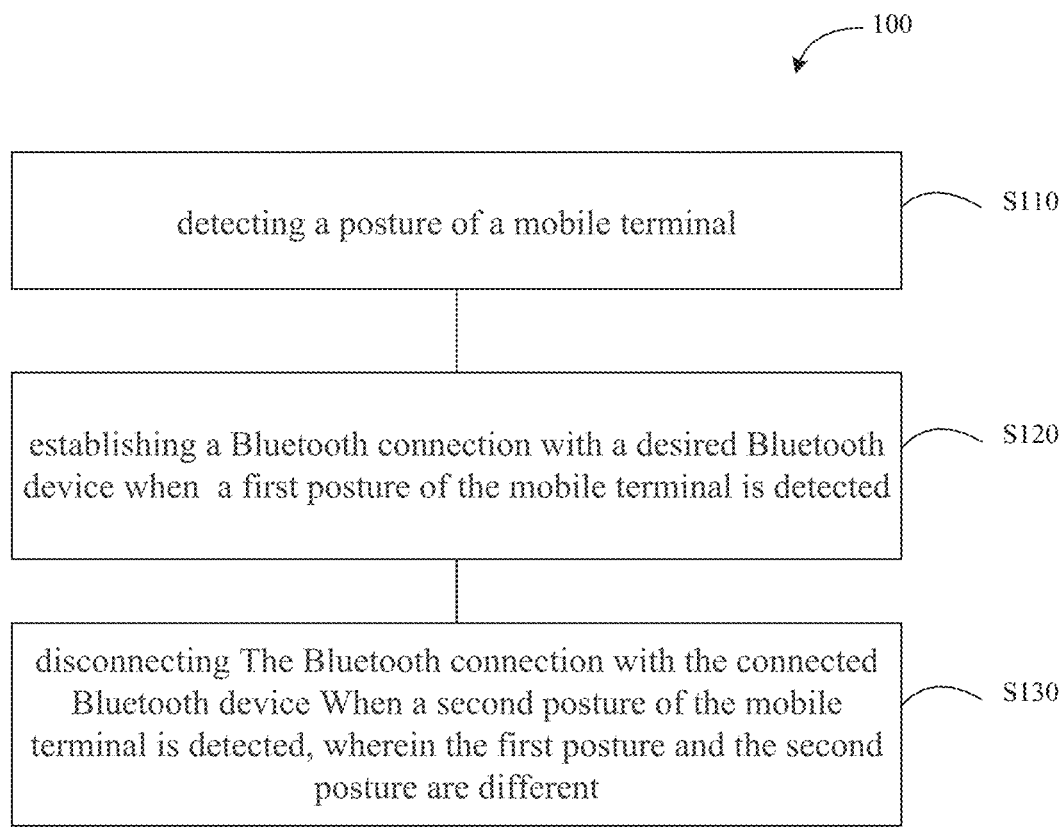
FIG. 1 illustrates a schematic flowchart of a Bluetooth communication method according to one embodiment of the present application.

The embodiments of the present application provide a Bluetooth communication method. FIG. 1 illustrates a schematic flowchart of a Bluetooth communication method 100 according to one embodiment of the present application. The Bluetooth communication method 100 may be applied to any mobile terminal that supports Bluetooth technology. Mobile terminals are computing devices that can be used in the process of movement. Mobile terminals may include: cell phones, remote controls, laptops, tablets, POS machines and so on. Before executing the Bluetooth communication method 100, both the mobile terminal and the Bluetooth device with which it is expected to be connected have already enabled Bluetooth communication.

As shown in FIG. 1, the Bluetooth communication method 100 may include the following step S110, and further includes step S120 and/or step S130.

At step S110, the posture of the mobile terminal is detected.

The mobile terminal is a device that can be used in the process of movement. Therefore, its posture may change in use. Exemplarily, the mobile terminal may be provided with a posture detection sensor. The posture detection sensor may detect the three-dimensional motion posture of the mobile terminal in real time. The posture may include the mobile terminal being placed squarely, sideways, or upside down, etc.

Figure 2:
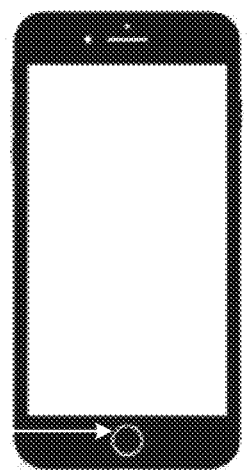
FIG. 2 illustrates a schematic diagram of a mobile terminal according to one embodiment of the present application.

For easy understanding, a cell phone with an IOS operating system is described below as an example of the above-mentioned mobile terminal. FIG. 2 illustrates a schematic diagram of a mobile terminal according to one embodiment of the present application. FIG. 2 illustrates the screen of the cell phone. In other words, the cell phone is placed squarely at present. The circular button indicated by a white arrow in FIG. 2 may represent a return button (home button) of the cell phone, and the plane on which the return button is located is an operating surface of the cell phone. It can be understood that the operating surface of the mobile device is the plane on which the user operates the mobile device. For a cell phone with a touch screen, the plane where a display screen is located is the operating surface. The cell phone shown in FIG. 2 is placed horizontally with the operating surface facing upwards, i.e. being placed squarely. It is understood that the cell phone may also have other postures, such as being horizontally placed, but with the operating surface facing to other orientations, for example, to the left. Of course, the cell phone may also be placed vertically and so on.

Based on the posture detection sensor provided in the cell phone, the current orientation and posture of the cell phone can be detected. The detected posture of the cell phone may be indicated by an orientation enumeration constant. Exemplarily, the orientation enumeration constants may indicate each of the following seven postures, respectively:

unknown orientation, where the cell phone screen) may be tilted;

the cell phone (screen) being oriented vertically, for the cell phone as shown in FIG. 2, a posture in which the return button is on the bottom of the screen;

the cell phone (screen) being oriented vertically and upside down, for the cell phone as shown in FIG. 2, a posture in which the return button is on the top of the screen;

the cell phone (screen) being horizontally oriented with the operating surface facing to the left;

the cell phone (screen) being horizontally oriented with the operating surface facing to the right;

the cell phone (screen) being horizontally oriented with the operating surface facing upwards.

By polling the above orientation enumeration constants, the posture of the cell phone can be determined.

At step S120, when a first posture of the mobile terminal is detected, a Bluetooth connection with a desired Bluetooth device is established.

Exemplarily, the first posture may be any posture of the mobile terminal. For example, the cell phone (screen) may be set to be the first posture by being horizontally oriented with the operating surface facing to the left. In one embodiment, a Bluetooth connection with a desired Bluetooth device may be automatically established when the cell phone is detected by the posture detection sensor to be horizontally oriented with the operating surface facing to the left. The Bluetooth device may also be any device that supports Bluetooth technology. For example, the Bluetooth device may be a thermostat, a game console, a cleaning robot, or other device that can be connected via Internet of Things.

Specifically, the paired Bluetooth devices in the list of paired devices on the mobile terminal may be scanned, and then a connection with a desired Bluetooth device may be established based on the Bluetooth information from the scanned Bluetooth devices.

After the Bluetooth connection is established between the mobile terminal and the desired Bluetooth device, data may be transmitted between the mobile terminal and the Bluetooth device. For example, for a thermostat, the information, such as about the current temperature under the control of the thermostat, may be sent to the mobile terminal for display by the mobile terminal. A control command may be sent to the thermostat by the mobile terminal to indicate a desired temperature. For a game console, it may be operated through the mobile terminal. Thus, the user is able to play the game console with the mobile terminal as an intermediary. Another example is that for a cleaning robot, the current position and posture of the cleaning robot may be sent to the mobile terminal. The mobile terminal may display the work process of the cleaning robot based on the position and posture. The cleaning robot may be controlled by the mobile terminal to do cleaning work according to the needs of the user.

At step S130, when a second posture of the mobile terminal is detected, the Bluetooth connection with the connected Bluetooth device may be disconnected. In other words, the mobile terminal disconnects from the connected Bluetooth device. The first posture is different from the second posture.

Exemplarily, the second posture may also be any posture of the mobile terminal. In the example where the Bluetooth communication method includes both step S120 and step S130, the second posture is different from the first posture. For example, in the example where the cell phone (screen) is set to be the first posture by being horizontally placed with the operating surface facing to the left, the cell phone (screen) may be set to be the second posture by being horizontally placed with the operating surface facing to the right. When the posture detection sensor detects the second posture, a disconnection request may be automatically sent to the connected Bluetooth device to disconnect from the Bluetooth device.

According to the above-mentioned Bluetooth communication method, by detecting the posture of the mobile terminal, the establishment of the connections to other Bluetooth devices or disconnections from the connected Bluetooth devices can be realized. This technical solution frees the user's fingers by eliminating the needs for very complicated manual operations for Bluetooth communications. Further, the method makes the processes of establishing Bluetooth connections and disconnection from the connected Bluetooth devices easier and smarter for the user.

Exemplarily, before the posture of the mobile terminal is detected at step S110, the method 100 may further comprise the following steps: detecting the motion of the mobile terminal. In this solution, establishing and/or disconnecting the Bluetooth connection with the desired Bluetooth device are executed only after a change in the motion of the mobile terminal is detected. That is to say, the Bluetooth connection with the desired Bluetooth device may be established and/or the connected Bluetooth device may be disconnected from only after it is determined that the mobile terminal has moved by detecting the motion of the mobile terminal. It can be understood that the motion of the mobile terminal can cause a change in its posture. In other words, the posture of the mobile terminal before the motion may be different from the posture after the motion. For example, if the mobile terminal is rotated, its placement orientation and/or operating surface orientation may change. Specifically, for example, when the mobile terminal is horizontally placed with the operating surface facing upwards, if it is rotated by 90 degrees on its long central axis, the orientation of its operating surface may change to face to the left or the right. In an example, when it is detected that the mobile terminal has moved and the posture after the motion is the first posture, the Bluetooth connection with other device is established; when it is detected that the mobile terminal has moved and the posture after the motion is the second posture, the mobile terminal disconnects from the connected Bluetooth device. Assuming that no motion of the mobile terminal is detected in the process of detecting the motion of the mobile terminal, i.e., the mobile terminal remains stationary at all times, step S120 or step S130 is not executed.

In one embodiment, the posture detection sensor described above may be used to detect the motion of the mobile terminal. Exemplarily, the posture detection sensor detects the motion of the mobile terminal in real time and with a certain frequency. If the posture of the mobile terminal detected at the current moment by the posture detection sensor is different from the posture detected at the previous moment, it is determined that the mobile terminal has moved, i.e. the motion of the mobile terminal has been detected. If the posture of the mobile terminal detected by the posture detection sensor at the current moment is the same as the posture detected at the previous moment, it is determined that no motion of the mobile terminal is detected currently.

According to the above technical solution, the abovementioned step S120 and step S130 are executed only after the motion of the mobile terminal is detected. This avoids that the mobile terminal keeps trying to connect to other Bluetooth device while the mobile terminal always remains in the first posture, and that the mobile terminal keeps trying to disconnect from the connected Bluetooth device while the mobile terminal always remains in the second posture. Thus, it is ensured that the subsequent operations are all as expected by the user, and the workload and power consumption of the mobile terminal are greatly reduced.

Exemplarily, detecting the posture of the mobile terminal at step S110 includes the following steps: detecting whether the mobile terminal is horizontally placed with its operating surface facing to the left, to determine the first posture; and/or detecting whether the mobile terminal is horizontally placed with its operating surface facing to the right, to determine the second posture.

In one embodiment, still taking a cell phone with a screen as an example, the operating surface of the cell phone is the plane where the screen of the cell phone is located. If the motion of the cell phone is detected and the cell phone is horizontally placed with the screen facing to the left after the motion, it can be determined that the cell phone is in the first posture. Similarly, If the motion of the cell phone is detected and the cell phone is horizontally placed with the screen facing to the right after the motion, it can be determined that the cell phone is in the second posture.

It is easier for the user to operate the cell phone to make it in the first posture and the second posture described above. In general, when the user operates the cell phone, the cell phone is usually horizontally placed with the operating surface facing upwards, i.e., the direction of the user's eyes. The user only needs to rotate the cell phone by 90 degrees counterclockwise during normal use of the cell phone to put it in the first posture, thereby the cell phone automatically establishing the Bluetooth connection with other device. Similarly, the user only needs to rotate the cell phone by 90 degrees clockwise during normal use of the cell phone to put it in the second posture, thereby the cell phone automatically disconnecting from the other Bluetooth device.

In the above technical solution, the user can change the mobile terminal from the usual posture to the first posture or the second posture by simple and easy rotation operation for the mobile terminal, which can bring the user a better use experience. Moreover, the first posture and the second posture described above are far apart from each other, so that the accuracy of posture detection is higher. And, in the example including both step S120 and step S130, it is difficult to confuse the two, thereby ensuring the smooth operation of Bluetooth communication.

Exemplarily, before establishing the Bluetooth connection with the desired Bluetooth device, the method may further comprise: sending a first prompt message to the user, wherein the operation of establishing the Bluetooth connection with the desired Bluetooth device is executed only after receiving a first confirmation information from the user in response to the first prompt message.

After the first posture of the mobile terminal is detected, the first prompt message may be sent to the user first. Various output devices of the mobile terminal may be used to send the first prompt message. For example, the first prompt message and a first operable control may be displayed on the screen of the mobile terminal The first operable control may be configured to receive a first confirmation information from the user in response to the first prompt message. The first operable control may be a button on the screen. The user may operate the first operable control to respond to the first prompt message. That is the user may input the first confirmation information by using of the first operable control. For example, the user may click on the aforementioned button to confirm the Bluetooth connection operation. After the first confirmation information is received from the user in response to the first prompt message, the Bluetooth connection with the desired Bluetooth device is established. Further exemplarily, the first prompt message may be played by the microphone of the mobile terminal. The user may respond to the first prompt message by pressing a button of the mobile terminal and so on. After the user's response to confirm the first prompt message, the Bluetooth connection with the desired Bluetooth device is established.

Similar to establishing the Bluetooth connection, before disconnecting the Bluetooth connection with the connected. Bluetooth device, the method may further comprise: sending a second prompt message to the user, wherein disconnecting from the connected Bluetooth device is executed only after receiving a second confirmation information from the user in response to the second prompt message. The second prompt message may also be sent by using various output devices of the mobile terminal. The input devices of the mobile terminal may be configured to receive the second confirmation information from the user in response to the second prompt message. In other words, the user may also operate various input devices of the mobile terminal to respond to the second prompt message. If the user's response indicates that be wishes to disconnect from the connected Bluetooth device, the Bluetooth connection can be disconnected.

In the above technical solution, after a specific posture of the mobile terminal is detected, the user is asked to confirm whether to execute the operation corresponding to the specific posture to connect to the Bluetooth device or to disconnect from the connected Bluetooth device, instead of executing the operation directly. This prevents the mobile terminal from executing the operations due to changes in the posture of the mobile terminal caused by unintentional actions of the user. As a result, it is ensured that the mobile terminal executes the operation as desired by the user, so that the computing and power resources of the mobile terminal can be saved.

Exemplarily, establishing the Bluetooth connection with the desired Bluetooth device at step S120 may comprise the following steps: first, scanning surrounding Bluetooth devices and then, based on the identifiers of the scanned Bluetooth devices, sending a Bluetooth connection request to a desired Bluetooth device among the scanned Bluetooth devices to connect to the desired Bluetooth device via Bluetooth.

Figure 3:
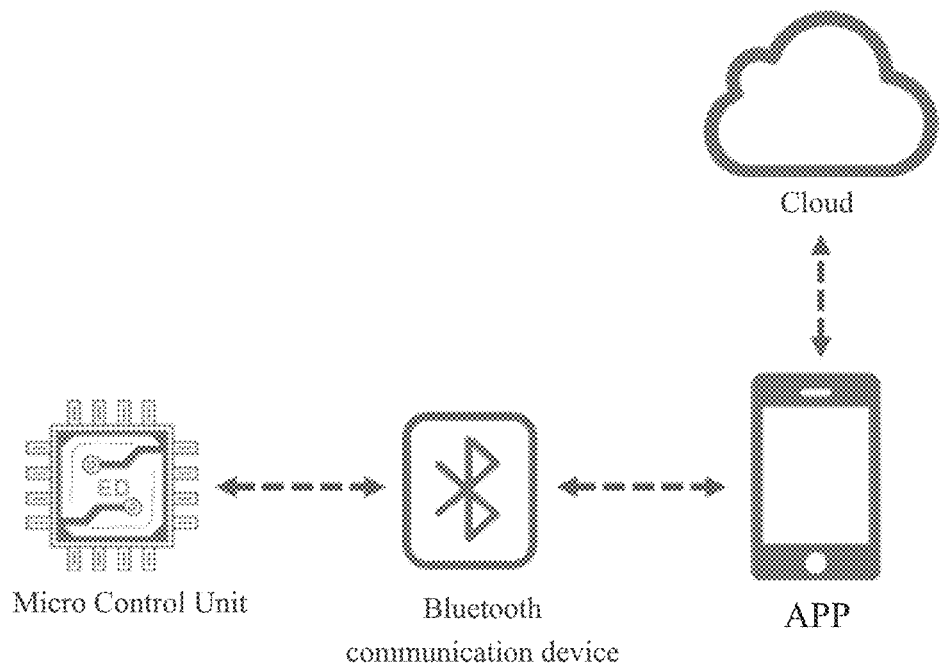
FIG. 3 illustrates a schematic diagram of establishing a Bluetooth connection with a desired Bluetooth device according to one embodiment of the, present application.

FIG. 3 illustrates a schematic diagram of establishing a Bluetooth connection with a desired Bluetooth device according to one embodiment of the present application. The mobile terminal may be provided with a micro control unit and a Bluetooth communication device, and be configured a corresponding APP. The micro control unit may run the APP to communicate based on Bluetooth technology. As shown in FIG. 3, the Bluetooth communication device may be controlled to enable the Bluetooth function by the micro control unit. Mier determining that the detected posture of the mobile terminal is the first posture, the Bluetooth devices existing around the mobile terminal may be scanned. These Bluetooth devices may keep broadcasting their respective Bluetooth broadcast packets. Each Bluetooth broadcast packet may include an identifier for the Bluetooth device, such as a Universally Unique Identifier (UUID). The mobile terminal finds and acquires these Bluetooth broadcast packets by Bluetooth scanning. The mobile terminal may compare the UUID of the Bluetooth device desired to be connected with the identifiers in these Bluetooth broadcast packets of the Bluetooth devices, respectively, to determine the desired Bluetooth device among these Bluetooth devices. It may be understood that in addition to the comparison of the identifiers, other conditions may exist for filtering Bluetooth devices. The mobile terminal may determine the Bluetooth device that satisfies the filtering conditions as the desired Bluetooth device to be connected based on the acquired Bluetooth broadcast packets. After the desired Bluetooth device is determined, a Bluetooth connection request is sent to the desired Bluetooth device. After the mobile terminal sends the Bluetooth connection request, the Bluetooth device may receive the Bluetooth connection request and establish a Bluetooth connection with the mobile terminal. When the Bluetooth connection is successfully established, a callback "Bluetooth connection successful" may be returned to the mobile terminal. This allows data communication based on the Bluetooth connection according to the user's need. If the Bluetooth connection fails, a callback "Bluetooth connection failed" is returned to the mobile terminal.

in the above technical solution, the Bluetooth connection with the Bluetooth device is established based on the results of scanning the surrounding Bluetooth devices by the mobile terminal and the identifier of each Bluetooth device. This ensures an accurate connection with the desired Bluetooth device.

Exemplarily, before sending a Bluetooth connection request to the desired Bluetooth device, the method may further comprise: acquiring the identifier of the Bluetooth device via a network to identify the desired Bluetooth device from the scanned Bluetooth devices.

The mobile terminal has acquired the identifier of the desired Bluetooth device before sending the Bluetooth connection request to the Bluetooth device. Referring again to the embodiment shown in FIG. 3, the mobile terminal may acquire the identifier of the desired Bluetooth device in advance by its APP from the cloud via a network. Then, the Bluetooth device to be connected may be selected out based on the filtering condition, and the filtering condition at least includes that the identifier contained in the Bluetooth broadcast packet of the scanned device is the identifier of the desired Bluetooth device.

In the above technical solution, the identifier of the desired Bluetooth device to be connected can be stored in advance in the cloud. It can be retrieved from the cloud when needed. This reduces the occupation of local storage space of the mobile terminal while ensuring the smooth establishment of the Bluetooth connections to the Bluetooth devices.

Exemplarily, the Bluetooth connection request may include the key of the desired Bluetooth device. Before sending the Bluetooth connection request to the desired Bluetooth device, the method may further comprise: acquiring the key of the desired Bluetooth device to connect with the desired Bluetooth device via Bluetooth.

In one embodiment, similar to the identifier of the Bluetooth device, the key may be pre-stored in the cloud. When the Bluetooth connection is established, the APP on the mobile terminal acquires the key of the desired Bluetooth device from the cloud. For example, when a Bluetooth connection between a cell phone and a thermostat is established for the first time, the cell phone may acquire the key of the thermostat. After acquiring the key, the cell phone may store it in the cloud for the subsequent Bluetooth connection with the thermostat. When the Bluetooth connection is established, the Bluetooth device can determine whether to establish the Bluetooth connection with the mobile device based on the key in the Bluetooth connection request.

In the above technical solution, the Bluetooth device is connected based on the key. The method can ensure the privacy of the Bluetooth connection. As a result, the security of the subsequent data transmissions is ensured.

Exemplarily, disconnecting the Bluetooth connection with the connected Bluetooth device at step S130 may comprise: sending a disconnection request to the connected Bluetooth device based on the identifier thereof to terminate the Bluetooth connection with the connected Bluetooth device and to make the Bluetooth device enter a broadcast state.

In one embodiment, on the basis of the QUID of the currently connected thermostat, the cell phone may send a disconnection request to the thermostat. After the thermostat receives the disconnection request, it may disconnect from the cell phone. If the disconnection is successful, a callback "Disconnection successful" can be sent to the cell phone. If the disconnection fails, a callback "Disconnection failed" can be sent to the cell phone. Exemplarily, if the disconnection request is unsuccessfully responded, i.e. the disconnection request is responded to with a failure message or is never responded to, for a predetermined period of time since the disconnection request was sent to the connected Bluetooth device, the Bluetooth connection with the connected Bluetooth device may be actively terminated. In other words, if the disconnection could not be executed by the thermostat successfully within the predetermined time period, the cell phone may actively disconnect from the thermostat. After the cell phone is disconnected from the thermostat, the thermostat may enter a broadcast state. As a result, the thermostat may be in a pending state for connection again. The cell phone may also revert to the state that it was in before scanning the Bluetooth devices. By actively terminating from the connected Bluetooth device, it can be ensured that the desired disconnection is executed in time. The unnecessary use of resources is avoided.

In the above technical solution, the mobile terminal may send the disconnection request to the Bluetooth device based on the identifier of the Bluetooth device. In this way, the disconnection from the Bluetooth device can be achieved smoothly.

According to another aspect of the present application, a mobile terminal is provided. Exemplarily, the mobile terminal may be a cell phone, a tablet personal computer, or a remote control, which supports the Bluetooth function. The hardware cost can be reduced by implementing the mobile terminal of the embodiment of the present invention based on these devices. For example, an APP may be installed on a cell phone to enable the cell phone to perform the above mentioned Bluetooth communication method. And then the cell phone can be the mobile terminal according to an embodiment of the present application.

Figure 4:
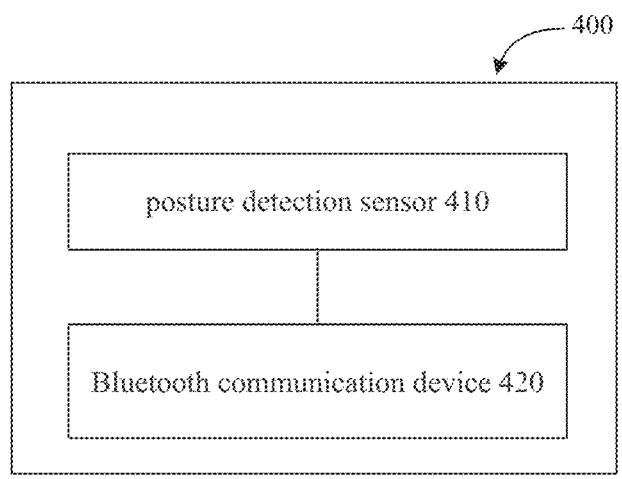
FIG. 4 illustrates a schematic block diagram of a mobile terminal according to one embodiment of the present application.

FIG. 4 illustrates a schematic block diagram of a mobile terminal 400 according to one embodiment of the present application, which may include a posture detection sensor 410 and a Bluetooth communication device 420, as shown in FIG. 4.

The posture detection sensor 410 may be configured to detect the posture of the mobile terminal.

The Bluetooth communication device 420 may be configured to establish a Bluetooth connection with a desired Bluetooth device when a first posture of the mobile terminal is detected. The Bluetooth communication device 420 may also be configured to disconnect the Bluetooth connection with the connected Bluetooth device when a second posture of the mobile terminal is detected. The first posture and the second posture are different.

Exemplarily, the posture detection sensor may also be configured to detect the motion of the mobile terminal. The Bluetooth communication device establishes and/or disconnects the Bluetooth connection with the desired connected Bluetooth device only after a change in the motion of the mobile terminal is detected.

In one embodiment, while the mobile terminal remains stationary, the Bluetooth communication device 420 neither establishes the Bluetooth connection with the desired Bluetooth device nor disconnects from the connected Bluetooth device even if the posture detected by the posture detection sensor 410 is the first posture or the second posture. The Bluetooth communication device 420 establishes the Bluetooth connection with the Bluetooth device only if the mobile terminal has performed a motion and is in the first posture after the motion. The Bluetooth communication device 420 disconnects from the connected Bluetooth device only if the mobile terminal has performed a motion and is in the second posture after the motion.

Exemplarily, the posture detection sensor 410 may be an accelerometer, a gyroscope, or an electronic compass. These posture detection sensors may accurately detect the posture of the mobile terminal and be low cost, and the technology thereof is mature. Therefore, it ensures that the mobile terminal can communicates smoothly with other Bluetooth devices based on its postures, and the cost of the mobile terminal can be reduced accordingly.

Exemplarily, the Bluetooth communication device 420 may be further configured to scan surrounding Bluetooth devices and send a Bluetooth connection request to the desired Bluetooth device based on the identifier of the scanned Bluetooth device to connect the desired Bluetooth device via Bluetooth. The mobile terminal may further comprises a network communication device (not shown) configured to acquire the identifier of the desired Bluetooth device via a network to identify the desired Bluetooth device from the scanned Bluetooth devices before sending the Bluetooth connection request to the desired Bluetooth device.

Exemplarily, the network communication device 420 may comprise a wired network connection device and/or a wireless network connection device. These communication devices technically mature and ensure the timeliness and accuracy of Bluetooth communication.

Exemplarily, the mobile terminal may further comprise a first output device and a first input device. The first output device may be configured to send a first prompt message to a user before the Bluetooth connection with the desired Bluetooth device is established. The first input device is configured to receive a first confirmation information from the user in response to the first prompt message. The Bluetooth communication device 420 may establish the Bluetooth connection with the desired Bluetooth device only after the first confirmation information is received.

Exemplarily, the first output device and the first input device is a same touch screen. The touch screen is technically mature. It has both input and output functions and offers the possibility of reducing the size of mobile terminal. So the mobile terminal can be easy to operate and improve the user experience of using it for Blue communication.

Exemplarily, the mobile terminal may further comprise a second Output device and a second input device. The second output device may be configured to send a second prompt message to a user before the Bluetooth connection with the connected Bluetooth device is disconnected. The second input device may be configured to receive a second confirmation information from the user in response to the second prompt message. The Bluetooth communication device 420 may disconnect the Bluetooth connection with the connected Bluetooth device only after the second confirmation information is received.

It may be understood that the first output device and the second output device may be implemented using the same or different devices. And the first input device and the second input device may be implemented using the same or different devices.

Optionally, all of the first input device, the first output device, the second input device and the second output device are implemented by a same device, such as a touch screen.

The specific structure and the beneficial effects of the mobile terminal 400 can be understood by reading the Bluetooth communication method 100 according to the embodiment of the present application, which will not be repeated herein for brevity.

According to a further aspect of the present application, a non-transitory, non-volatile storage medium is also provided. The non-transitory, non-volatile storage medium is configured to store program instructions. The program instructions, when running, are configured to perform the steps of the Bluetooth communication method 100 mentioned above. The storage medium may include, for example, a storage component of a tablet computer, a hard disk of a personal computer, an erasable programmable read only memory (EPROM), a portable compact disk read only memory (CD-ROM), a USB memory, or any combination of the above storage media. The computer-readable storage media may be any combination of one or more computer-readable storage media.

A skilled person in the art can understand the above specific implementation scheme for the mobile terminal and the non-volatile storage medium by reading the above description relating to the Bluetooth communication method 100, and for the sake of brevity, it will not be repeated herein.

Although exemplary embodiments have already described with reference to the accompanying drawings here, it should be understood that the above embodiments are merely exemplary and are not intended to limit the scope of the present invention to this. Persons of ordinary skill in the art can make various changes and modifications without departing from the spirit and scope of the present invention. All these changes and modifications are intended to be included within the scope of the present invention defined by the appended claims.

One of ordinary skilled in the art can appreciate that the units and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of the technical solution. The skilled person can use different methods to implement the described functions for each particular application, but such implementations should not be considered outside the scope of this application.

In several embodiments provided by the present application, it should be understood that the disclosed devices and methods may be implemented by other manners. For example, the device embodiments described above are merely schematic. For example, the partitioning of the units is a logical functional partitioning. There may be other partitioning manners in actual implementation. For example, multiple units or components may be combined or integrated into another device, or some features may be ignored or not performed.

Numerous specific details are set forth in the description provided herein. However, it can be understood that the embodiments of the present invention may be practiced without these specific details. In some examples, well-known methods, structures and techniques have not been shown in detail in order not to obscure an understanding of this description.

Similarly, it should be understood that various features of the present invention are sometimes grouped together in a single embodiment, figure, or description thereof for the purpose of streamlining the present invention and aiding in the understanding of one or more of the various inventive aspects. The method of the present invention, however, should not to be interpreted as reflecting an intention that the claimed present invention requires more features than those expressly defined in each claim. Rather, as the corresponding claims reflect, inventive aspects lie in that the corresponding technical problems can be solved with the features less than all features of a certain single disclosed embodiment. Thus, the claims following the detailed description are hereby expressly incorporated into this detailed description, with each claim standing on its own as a separate embodiment of the present invention.

It will be understood by those skilled in the art that all of the features disclosed in this description (including the appended claims, abstract and accompanying drawings) and all of the processes or units of any method or device disclosed in such a way may be combined in any combination, except combinations where features are mutually exclusive. Each feature disclosed in this description (including the appended claims, abstract and accompanying drawings) may be replaced by alternative features serving the same, equivalent or similar purpose, unless expressly stated otherwise.

In addition, it may be understood by those skilled in the art that while some embodiments described herein include some but not other features included in other embodiments, combinations of features of different embodiments are meant to be within the scope of the present invention, and form different embodiments. For example, in the claims, any of the claimed embodiments can be used in any combination manner.

The various component embodiments of the present application may be implemented in hardware, or in software modules running on one or more processors, or in a combination thereof. It should be understood by those skilled in the art that a microprocessor or digital signal processor (DSP) may be used in practice to implement some or all of the functions of some of the modules in the mobile terminal according to embodiments of the present application. The present application may also be implemented as programs (e.g., computer programs and a computer program product) for performing some or all of the methods described herein. Such programs implementing the present application may be stored on a computer readable medium or may have the form of one or more signals. Such signals may be obtained by download from an Internet site, or provided on a carrier signal or in any other form.

It should be noted that the above embodiments illustrate the present application and do not limit it, and that replacement embodiments may be devised by those skilled in the art without departing from the scope of the appended claims. In the claims, any reference in the brackets should not be constructed as a limitation of the claims. The word "comprising" does not preclude the presence of an element or step not listed in the claim. The word "a" or "an" preceding an element does not exclude the existence of multiple elements. The present application can be implemented as hardware comprising several different components or with the help of a computer suitably programmed. In the claims where several devices are listed, several of these devices may be embodied by the same hardware. The use of the words "first", "second", and "third" etc. does not indicate any order. These words may be interpreted as a part of names.

The above description is merely a specific implementation manner of the present invention or is illustrative of the specific implementation manner of the present invention, but the scope of protection of the present invention is not limited to this. Any changes or replacements that would be readily conceived by any person skilled in the art should be within the scope of protection of the present invention. The scope of protection of the present invention shall be subject to the scope of protection defined by the claims.

What is claimed is:

1. A Bluetooth communication method, comprising the following steps:
    detecting a first posture of a mobile terminal, the first posture being that the mobile terminal is horizontally placed with its operating surface facing to the left or right;
    establishing a Bluetooth connection with a Bluetooth device upon determining that the first posture of the mobile terminal is detected after a first motion of the mobile terminal;
    detecting a second posture of the mobile terminal, the second posture being that the mobile terminal is horizontally placed with its operating surface facing to the right or left; and
    disconnecting the Bluetooth connection with the Bluetooth device upon determining that the second posture of the mobile terminal is detected after a second motion of the mobile terminal;
    wherein the first posture and the second posture are different and wherein the first motion and the second motion are different, and wherein facing to the left is achieved by rotating the mobile device by 90 degrees counterclockwise from a direction that the operating surface facing upwards, and wherein facing to the right is achieved by rotating the mobile device by 90 degrees clockwise from the direction that the operating surface facing upwards.

2. The Bluetooth communication method according to claim 1, wherein said establishing the Bluetooth connection with the Bluetooth device comprises:
    scanning surrounding Bluetooth devices;

sending a Bluetooth connection request to the Bluetooth device based on the identifier of the scanned Bluetooth device to connect the Bluetooth device via Bluetooth.

3. The Bluetooth communication method according to claim 2, wherein the method further comprises:
acquiring the identifier of the Bluetooth device via a network to identify the Bluetooth device from the scanned Bluetooth devices before sending the Bluetooth connection request to the Bluetooth device.

4. The Bluetooth communication method according to claim 2, wherein the Bluetooth connection request includes the key of the Bluetooth device; and the method further comprises:
acquiring the key of the Bluetooth device before sending the Bluetooth connection request to the Bluetooth device to connect with the Bluetooth device via Bluetooth.

5. The Bluetooth communication method according to claim 1, wherein said disconnecting the Bluetooth connection with the Bluetooth device comprises:
sending a disconnection request to the Bluetooth device based on the identifier thereof to terminate the Bluetooth connection with the Bluetooth device and to make the Bluetooth device enter a broadcast state.

6. The Bluetooth communication method according to claim 5; wherein said disconnecting the Bluetooth connection with the Bluetooth device further comprises:
actively terminating the Bluetooth connection with the Bluetooth device if the disconnection request is unsuccessfully responded for a predetermined period of time after it has been sent to the Bluetooth device.

7. The Bluetooth communication method according to claim 1, wherein the method further comprises: sending a first prompt message to a user before establishing the Bluetooth connection with the Bluetooth device;
wherein said establishing the Bluetooth connection with the Bluetooth device is executed only after receiving a first confirmation information from the user in response to the first prompt message.

8. The Bluetooth communication method according to claim 1, wherein the method further comprises: sending a second prompt message to a user before disconnecting the Bluetooth connection with the Bluetooth device;
wherein said disconnecting the Bluetooth connection with the Bluetooth device is executed only after receiving a second confirmation information from the user in response to the second prompt message.

9. The Bluetooth communication method according to claim 1, further comprising maintaining a previous state of the Bluetooth connection upon determining that the mobile terminal is stationary and in the first posture or the second posture.

10. A mobile terminal, comprising:
a posture detection sensor configured to detect a first posture of the mobile terminal, the first posture being that the mobile terminal is horizontally placed with its operating surface facing to the left or right:
a Bluetooth communication device configured to:
establish a Bluetooth connection with a Bluetooth device upon determining that the first posture of the mobile terminal is detected after a first motion of the mobile terminal:
wherein the posture detection sensor is further configured to detect a second posture of the mobile terminal, the second posture being that the mobile terminal is horizontally placed with its operating surface facing to the right or left;
wherein the Bluetooth communication device is further configured to:
disconnect the Bluetooth connection with the Bluetooth device upon determining that the second posture of the mobile terminal is detected after a second motion of the mobile terminal;
wherein the first posture and the second posture are different, and wherein the first motion and the second motion are different, and wherein facing to the left is achieved by rotating the mobile device by 90 degrees counterclockwise from a direction that the operating surface facing upwards, and wherein facing to the right is achieved by rotating the mobile device by 90 degrees clockwise from the direction that the operating surface facing upwards.

11. The mobile terminal according to claim 10, wherein the posture detection sensor is an accelerometer, a gyroscope, or an electronic compass.

12. The mobile terminal according to claim 10, wherein the Bluetooth communication device is further configured to scan surrounding Bluetooth devices and send a Bluetooth connection request to the Bluetooth device based on the identifier of the scanned Bluetooth device to connect the Bluetooth device via Bluetooth; and
the mobile terminal further comprises a network communication device configured to acquire the identifier of the Bluetooth device via a network to identify the Bluetooth device from the scanned Bluetooth devices before the Bluetooth connection request is sent to the Bluetooth device.

13. The mobile terminal according to claim 12, wherein the network communication device comprises a wired network connection device and/or a wireless network connection device.

14. The mobile terminal according to claim 10, wherein the mobile terminal further comprises a first output device and a first input device,
the first output device is configured to send a first prompt message to a user before the Bluetooth connection with the Bluetooth device is established;
the first input device is configured to receive a first confirmation information from the user in response to the first prompt message;
the Bluetooth communication device establishes the Bluetooth connection with the Bluetooth device only after the first confirmation information is received.

15. The mobile terminal according to claim 14, wherein the first output device and the first input device is a same touch screen.

16. The mobile terminal according to claim 10, wherein the mobile terminal further comprises a second output device and a second input device,
the second output device is configured to send a second prompt message to a user before the Bluetooth connection with the Bluetooth device is disconnected;
the second input device is configured to receive a second confirmation information from the user in response to the second prompt message;
the Bluetooth communication device disconnects the Bluetooth connection with the Bluetooth device only after the second confirmation information is received.

17. The mobile terminal according to claim 10, wherein the mobile terminal is a cell phone, a tablet personal computer, or a remote control.

18. A non-transitory storage medium, storing program instructions which are configured to perform, when running:

detecting a first posture of a mobile terminal, the first posture being that the mobile terminal is horizontally placed with its operating surface facing to the left or right;

establishing a Bluetooth connection with a Bluetooth device upon determining that the first posture of the mobile terminal is detected after a first motion of the mobile terminal;

detecting a second posture of the mobile terminal, the second posture being that the mobile terminal is horizontally placed with its operating surface facing to the right or left; and disconnecting the Bluetooth connection with the Bluetooth device upon determining that the second posture of the mobile terminal is detected after a second motion of the mobile terminal;

wherein the first posture and the second posture are different, and wherein the first motion and the second motion are different, and wherein facing to the left is achieved by rotating the mobile device by 90 degrees counterclockwise from a direction that the operating surface facing upwards, and wherein facing to the right is achieved by rotating the mobile device by 90 degrees clockwise from the direction that the operating surface facing upwards.

* * * * *